US012092316B1

(12) United States Patent
Yang et al.

(10) Patent No.: US 12,092,316 B1
(45) Date of Patent: Sep. 17, 2024

(54) HEAD ASSEMBLY AND FAN APPARATUS

(71) Applicant: GD MIDEA ENVIRONMENT APPLIANCES MFG CO., LTD., Zhongshan (CN)

(72) Inventors: Zhong Yang, Zhongshan (CN); Jun Liu, Zhongshan (CN); Zengxing Yang, Zhongshan (CN)

(73) Assignee: GD MIDEA ENVIRONMENT APPLIANCES MFG CO., LTD., Zhongshan (CN)

( * ) Notice: Subject to any disclaimer, the term of this patent is extended or adjusted under 35 U.S.C. 154(b) by 0 days.

(21) Appl. No.: 18/382,721

(22) Filed: Oct. 23, 2023

(30) Foreign Application Priority Data

Mar. 15, 2023 (CN) ......................... 202320495239.5

(51) Int. Cl.
*F21V 33/00* (2006.01)
*F21V 15/01* (2006.01)
*F21V 21/30* (2006.01)
*F21V 29/508* (2015.01)

(52) U.S. Cl.
CPC .......... *F21V 33/0096* (2013.01); *F21V 15/01* (2013.01); *F21V 21/30* (2013.01); *F21V 29/508* (2015.01)

(58) Field of Classification Search
CPC .... F21V 33/0096; F21V 29/508; F21V 15/01; F21V 21/30
See application file for complete search history.

(56) References Cited

U.S. PATENT DOCUMENTS 7,758,196 B1 * 7/2010 He ...................... F21V 33/0096 362/253
8,939,617 B2 * 1/2015 Kim ........................ F21K 9/233 362/373
10,585,463 B1 * 3/2020 Huang ................. G02B 6/0028
11,703,217 B1 * 7/2023 Lin ....................... F04D 29/388 415/121.3
2012/0287642 A1 * 11/2012 Zeng ......................... F21K 9/00 362/294
2013/0271996 A1 * 10/2013 Horng ....................... F21K 9/23 362/294
2019/0029143 A1 * 1/2019 Xie ..................... F04D 25/0613
2020/0116348 A1 * 4/2020 Huang ................ F04D 25/0613
2022/0049706 A1 * 2/2022 Fan ..................... F21V 33/0096

* cited by examiner

*Primary Examiner* — Bryon T Gyllstrom
(74) *Attorney, Agent, or Firm* — Anova Law Group, PLLC

(57) ABSTRACT

A head assembly includes a cover structure provided with an air outlet end and an air inlet end that are opposite each other, a fan assembly arranged in the cover structure, and a lighting device arranged at the air inlet end of the cover structure. The lighting device is configured to emit light rays towards a direction away from the air outlet end.

17 Claims, 4 Drawing Sheets

HEAD ASSEMBLY AND FAN APPARATUS

CROSS-REFERENCE TO RELATED APPLICATION

This application claims priority to Chinese Application No. 202320495239.5, filed with the China National Intellectual Property Administration on Mar. 15, 2023 and entitled "head assembly and fan apparatus," the entire content of which is incorporated herein by reference.

FIELD

The present application relates to the field of fans, and in particular to a head assembly and a fan apparatus.

BACKGROUND

Currently, a fan merely functions to blow air, which is single. In order to improve functionality, structure with lighting function is added to some fans. However, the existing fan typically lights the front, since light is emitted in a direction that is the same as an air supply direction, which limits a lighting range. If the lighting range is set to be large, an air supply area will be affected. It is difficult to balance lighting function and air supplying function.

SUMMARY

The present application aims to at least solve one of the problems in the related art.

In view of this, an embodiment of a first aspect of the present application provides a head assembly.

An embodiment of a second aspect of the present application provides a fan apparatus.

In order to achieve the above objective, the embodiment of the first aspect of the present application provides the head assembly. The head assembly includes: a cover structure, where a fan assembly is arranged in the cover structure, and the cover structure is provided with an air outlet end and an air inlet end that are opposite each other; and a lighting device arranged at the air inlet end of the cover structure, where the lighting device emits light rays towards a direction away from the air outlet end.

The head assembly according to the present application mainly includes the cover structure and the lighting device. The fan assembly is arranged inside the cover structure, and during operation of the fan assembly, air may flow into the cover structure from the air inlet end, and flow out by the air outlet end. In the present application, the lighting device is arranged at the air inlet end of the cover structure, and after the lighting device is energized, the lighting device performs lighting towards a rear side, i.e. a direction away from the air outlet end. By the head assembly according to the present application, a front surface may satisfy daily air-blowing and cooling needs of a user, and a back surface may satisfy a daily lighting needs of the user. Compared with a solution of front-side lighting, the solution has no limitation on a size of the lighting device on a rear side, and has an excellent lighting effect, thereby forming a multi-functional solution of front air supplying and rear lighting.

The air inlet end and the air outlet end of the cover structure are two opposite ends of the head assembly along an axial direction, and the fan assembly may use an axial flow fan or a centrifugal fan.

Moreover, in the present application, air is only limited to flow out from the air outlet end. The air inlet end is located at the other, opposite side of the air outlet end, and air flows into the cover structure by the air inlet end. However, a position of an air inlet may be flexibly adjusted. For example, the air inlet may be directly provided at an end surface of the air inlet end, or may be provided at a circumferential side wall close to the air inlet end as long as normal flow of air may be satisfied.

The cover structure may have a cylindrical shape, a spherical shape, or any shape that allows rotation of the fan assembly without collision.

It needs to be noted that the cover structure may have a grid shape or net shape.

In the embodiment described above, the air inlet end of the cover structure is provided with a mounting port, and the lighting device specifically includes: a lighting housing arranged at the mounting port; and a lighting member arranged in the lighting housing.

In the embodiment described above, the mounting port is provided, the mounting port is provided at the air inlet end of the cover structure, and the lighting housing of the lighting device is mounted at the mounting port, and light may pass through the lighting housing to be emitted outwards under the condition that the lighting member located inside the lighting housing emits light, thereby lighting a rear side of the head assembly.

A shape of the mounting port matches a shape of the lighting housing. A detachable connection is provided between the lighting housing and the mounting port, and includes a clamping connection, a magnetic attraction connection, etc. Further, a fixed connection may be provided between the lighting housing and the mounting port.

The lighting housing has light transmission to some extent.

In the embodiment described above, the lighting housing specifically includes: a mounting member and a lamplight shade that are detachably connected, where the lamplight shade is arranged at one side of the mounting member away from the air outlet end; and light emitted by the lighting member is emitted outwards through the lamplight shade.

In the embodiment, the lighting housing mainly includes the mounting member and the lamplight shade, where the mounting member is detachably connected to the lamplight shade, to arrange the lighting member inside the lighting housing. On this basis, the lamplight shade is arranged at the rear side, i.e. one side away from the air outlet end, and light may be emitted towards the rear side through the lamplight shade to achieve lighting.

The mounting member is fixed on the cover structure, and a specific fixing position may be flexibly selected according to different structures. For example, the mounting member may be fixed on an air inlet net cover by the lamplight shade, may further be directly fixed on a middle housing, or even may be fixed on part of a structure of the fan assembly that does not rotate.

In the embodiment described above, the mounting member is disc-shaped, the lighting member is a lamp strip connected to the mounting member along its circumference.

In the embodiment, the disc-shaped mounting member is used, and the lamp strip may be directly connected to the disc-shaped mounting member in the circumferential direction when the lighting member is mounted. A specific connection manner includes, but not limited to, bonding, clamping, etc., as long as limiting fixation may be achieved.

In the embodiment described above, the lighting member is connected to a bottom wall surface of the mounting member.

In the embodiment, the disc-shaped mounting member is provided with a side wall and a bottom wall. In the solution, the lighting member is directly connected to the bottom wall surface of the mounting member, and light generated by lamp beads on the lamp strip is perpendicular to the bottom wall surface to be directed towards the rear side, which has an excellent projection effect.

In the embodiment described above, the lighting member is connected to a side wall surface of the mounting member, and the head assembly further includes: a reflector, a light guide and a diffusion member that are sequentially arranged along an axial direction of the fan assembly, where the reflector is arranged close to the mounting member, and in the axial direction of the fan assembly, projections of the reflector, the light guide and the diffusion member on the lighting member are located inside the lighting member.

In the embodiment, the lighting member is connected to the side wall surface of the mounting member, the light generated by the lamp beads is perpendicular to the side wall surface to be directed towards a center in a radial direction, and brightness of a central portion is higher. Three structures, that is, the reflector, the light guide, and the diffusion member are arranged, and a light path of the light may be limited. Specifically, all the three structures are arranged at a radial inner side of the lighting member, and the reflector is arranged at an axial inner side of the lighting member. That is, the reflector is arranged close to the mounting member. The reflector may block and reflect light directed towards the air outlet end, and then limit a propagation direction of the light by the light guide, thereby enhancing brightness. Further, after the light passes through the diffusion member, uniformity of lighting may be improved.

The reflector may be a reflection plate or reflection paper. The light guide is a light guide plate, and the diffusion member is a diffusion plate.

In the embodiment described above, a mounting recess is provided at the lamplight shade, and the head assembly further includes: a light shielding plate detachably connected to the mounting recess, where the light shielding plate is configured to shield part of light emitted by the lighting member.

In the embodiment, the mounting recess is provided at the lamplight shade, and the light shielding plate may be arranged in the mounting recess. When light emitted by the lighting member passes through the light shielding plate, the light is blocked, which weakens concentrated lighting points of the lamp beads in appearance, and the emitted light is more uniform, and user experience is improved.

In the embodiment described above, the cover structure specifically includes: a shell, where a connection support is arranged in the shell, and the fan assembly and the lighting device are connected to two sides of the connection support respectively; a first cover detachably connected to a first end of the shell; and a second cover detachably connected to a second end of the shell.

In the embodiment, the cover structure integrally has a three-segment structure, i.e. the shell, and the first cover and the second cover arranged at two ends of the shell respectively. The first cover and the second cover are both detachably connected to the two ends of the shell, to assemble the fan assembly conveniently. An axial dimension of the cover structure as a structure that accommodates the fan assembly should be greater than that of the fan assembly. Specifically, an axial dimension of the shell may be greater than an axial dimension of the fan assembly, or an axial dimension of the shell plus the first cover may further be greater than an axial dimension of the fan assembly, or an axial dimension of the shell plus the second cover is further greater than an axial dimension of the fan assembly.

It needs to be noted that the first cover is located at a front side of the shell, i.e. an air outlet side, and the second cover is located at a rear side of the shell, i.e. an air inlet side, thereby ensuring lighting of the rear side without affecting air supplying to the front side.

Air inlets may be only provided at the second cover, or may be all provided at the shell.

Similarly, air outlets may be only provided at the first cover, or may be all provided at the shell.

The connection support is arranged in the shell, and the lighting device and the fan assembly are arranged at two sides of the connection support respectively, and are fixed by the connection support. Further, the lighting device is arranged at one side of the connection support close to the second cover, and the fan assembly is arranged at one side of the connection support close to the first cover.

The lighting device is connected to the shell by the connection support, and is limited and fixed by a port on the second cover.

Further, the connection support is in a shape of three claws, four claws, or multiple claws, and the connection support is connected to a circumferential side wall of the shell.

In the embodiment described above, the head assembly further includes: a wire passing recess provided at the connection support, where a wire of the lighting device passes through the wire passing recess.

In the embodiment, the wire passing recess is provided at the connection support, and routing needs for the wire supplying power to the lighting device can be satisfied.

The wire passing recess may be provided at a circumferential inner side of the connection support, and may further be provided at an axial central portion.

In the embodiment described above, the head assembly further includes: a rotatable support rotatably connected to the shell.

In the embodiment, the rotatable support is arranged, and the cover structure may drive the entire fan assembly to rotate, thereby achieving an effect of shaking a head. Specifically, rotation of the shell may be up-down rotation, or left-right rotation.

The embodiment of the second aspect of the present application provides a fan apparatus. The fan apparatus includes: a support seat; and the head assembly of any one of the first aspect described above that is arranged at the support seat.

The fan apparatus according to the present application includes the support seat and the head assembly, where the support seat has an effect of supporting the head assembly. Since the fan apparatus includes the head assembly, the fan apparatus has the beneficial effects of any one of the head assembly in the embodiment of the first aspect described above, which will not be repeated herein.

According to different structures of the support seat, the fan apparatus may be a floor-standing type fan apparatus or a desktop type fan apparatus. Moreover, the support seat may be directly clamped to a table, attached to a wall, or erected on ground.

Additional aspects and advantages of the present application will become obvious in the following description, or may be learned by practice of the present application.

Figure 1:
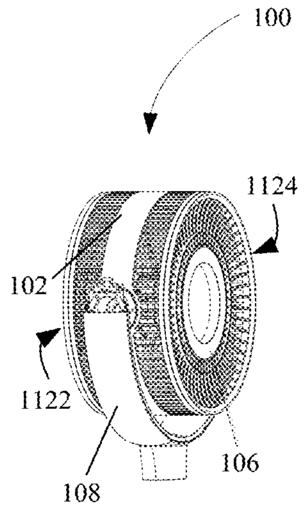
FIG. 1 shows a schematic structural diagram of a head assembly according to an embodiment of the present application.
Figure 2:
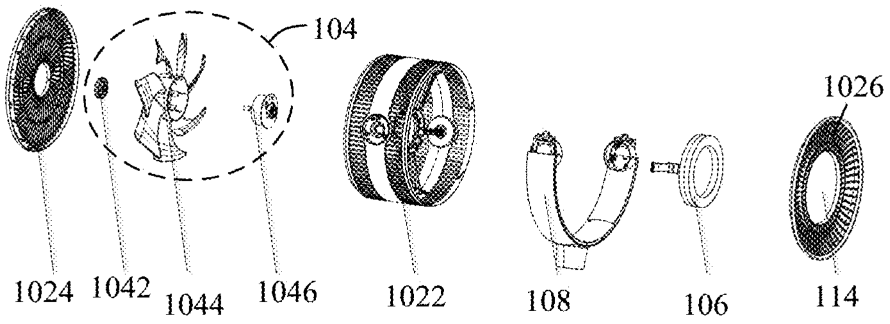
FIG. 2 shows a schematic exploded structural diagram of a head assembly according to an embodiment of the present application.

Corresponding relations between reference numerals and component names in FIGS. 1-4 are as follows:

100: head assembly; 102: cover structure; 1022: shell; 1023: connection support; 1024: first cover; 1026: second cover; 104: fan assembly; 1042: lock nut; 1044: fan blade; 1046: motor; 106: lighting device; 1062: lighting housing; 1064: mounting member; 1065: lamplight shade; 1066: reflector; 1067: light guide; 1068: diffusion member; 1069: light shielding plate; 107: lighting member; 108: rotatable support; 110: wire passing recess; 1122: air outlet end; 1124: air inlet end; 114: mounting port; 116: mounting recess;

200: fan apparatus; and 202: support seat.

DETAILED DESCRIPTION OF THE DISCLOSURE

In order to make the above objectives, features, and advantages of embodiments of the present application clearer and more comprehensible, the embodiments of the present application will be further described in detail below with reference to the accompanying drawings and the specific implementations. Embodiments of the present application and features in the embodiments can be combined with one another where there is no conflict.

Many specific details are set forth in the following description to facilitate full understanding of the present application, but the embodiments of the present application may further be implemented in other ways different from those described herein, and therefore the scope of protection of the present application is not limited by the particular embodiments disclosed below.

Some embodiments according to the present application will be described below with reference to FIGS. 1-4.

As shown in FIG. 1, a head assembly 100 according to the embodiment mainly includes a cover structure 102 and a lighting device 106. A fan assembly 104 is arranged inside the cover structure 102, and during operation of the fan assembly 104, air may flow into the cover structure 102 from an air inlet end 1124, and flow out by an air outlet end 1122. In the present application, the lighting device 106 is arranged at the air inlet end 1124 of the cover structure 102, and after the lighting device 106 is energized, the lighting device performs lighting towards a rear side, i.e. a direction away from the air outlet end 1122. By the head assembly 100 according to the present application, a front surface may satisfy daily air-blowing and cooling needs of a user, and a back surface may satisfy a daily lighting needs of the user. Compared with a solution of front-side lighting, the solution has no limitation on a size of the lighting device 106 on a rear side, and has an excellent lighting effect, thereby forming a multi-functional solution of front air supplying and rear lighting.

The air inlet end 1124 and the air outlet end 1122 of the cover structure 102 are two opposite ends of the head assembly 100 along an axial direction, and the fan assembly 104 may use an axial flow fan or a centrifugal fan.

Moreover, in the present application, air is only limited to flowing out from the air outlet end 1122. The air inlet end 1124 is located at the other, opposite side of the air outlet end 1122, and air flows into the cover structure by the air inlet end 1124. However, a position of an air inlet may be flexibly adjusted. For example, the air inlet may be directly provided at an end surface of the air inlet end 1124, or may be provided at a circumferential side wall close to the air inlet end 1124 as long as normal flow of air may be satisfied.

The cover structure 102 may have a cylindrical shape, a spherical shape, or any shape that allows rotation of the fan assembly 104 without collision.

In an embodiment, a cover structure 102 may have a grid shape.

In an embodiment, a cover structure 102 may have a net shape.

Further, a mounting port 114 is provided, and the mounting port 114 is provided at the air inlet end 1124 of the cover structure 102, and a lighting housing 1062 of the lighting device is mounted at the mounting port 114, and light may pass through the lighting housing 1062 to be emitted outwards under the condition that a lighting member 107 located inside the lighting housing 1062 emits light, thereby lighting a rear side of the head assembly 100.

A shape of the mounting port 114 matches a shape of the lighting housing 1062. A detachable connection is provided between the lighting housing 1062 and the mounting port 114, and includes a clamping connection, a magnetic attraction connection, etc. Further, a fixed connection may be provided between the lighting housing and the mounting port.

In some embodiments, the lighting housing 1062 has light transmission to some extent, i.e., the lighting housing 1062 is not opaque.

The lighting housing 1062 mainly includes a mounting member 1064 and a lamplight shade 1065, where the mounting member is detachably connected to the lamplight shade, to arrange the lighting member 107 inside the lighting housing. On this basis, the lamplight shade 1065 is arranged at the rear side, i.e. one side away from the air outlet end 1122, and light may be emitted towards the rear side through the lamplight shade 1065 to achieve lighting.

The mounting member 1064 is fixed on the cover structure 102, and a specific fixing position may be flexibly selected according to different structures. For example, the mounting member may be fixed on an air inlet net cover by the lamplight shade 1065, may further be directly fixed on a middle housing, or even may be fixed on part of a structure of the fan assembly 104 that does not rotate.

In an embodiment, a disc-shaped mounting member 1064 is used, and a lamp strip may be directly connected to the disc-shaped mounting member 1064 in the circumferential direction when a lighting member 107 is mounted. A specific connection manner includes, but not limited to, bonding, clamping, etc., as long as limiting fixation may be achieved.

Further, the disc-shaped mounting member 1064 is provided with a side wall and a bottom wall. In a particular embodiment, a lighting member 107 is directly connected to a bottom wall surface of a mounting member 1064, and light generated by lamp beads on a lamp strip is perpendicular to the bottom wall surface to be directed towards a rear side, which has an excellent projection effect.

Further, a mounting recess 116 is further provided at a lamplight shade 1065, and a light shielding plate 1069 may be arranged in a mounting recess 116. When light emitted by the lighting member 107 passes through the light shielding plate 1069, the light is blocked, which weakens concentrated lighting points of the lamp beads in appearance, and the emitted light is more uniform, and user experience is improved.

On the basis of any embodiment described above, as shown in FIG. 2, a cover structure 102 integrally has a three-segment structure, i.e. a shell 1022 and a first cover 1024 and a second cover 1026 arranged at two ends of the shell 1022 respectively. The first cover 1024 and the second cover 1026 are both detachably connected to two ends of the shell 1022, to assemble a fan assembly 104 conveniently. An axial dimension of the cover structure 102 as a structure that accommodates the fan assembly 104 should be greater than that of the fan assembly 104. Specifically, an axial dimension of the shell 1022 may be greater than an axial dimension of the fan assembly 104, or an axial dimension of the shell 1022 plus the first cover 1024 may further be greater than an axial dimension of the fan assembly 104, or an axial dimension of the shell 1022 plus the second cover 1026 is further greater than an axial dimension of the fan assembly 104.

It needs to be noted that the first cover 1024 is located at a front side of the shell 1022, i.e. an air outlet side, and the second cover 1026 is located at a rear side of the shell 1022, i.e. an air inlet side, thereby ensuring lighting of the rear side without affecting air supplying to the front side.

Figure 3:
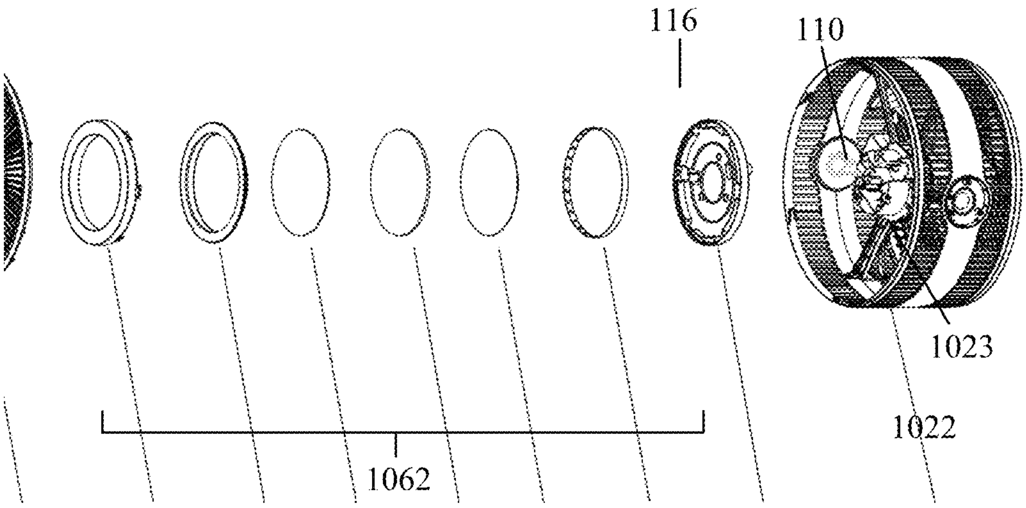
FIG. 3 is a schematic structural diagram of a head assembly according to an embodiment of the present application.

As shown in FIG. 3, a connection support 1023 is arranged in a shell 1022, and a lighting device 106 and a fan assembly 104 are arranged at two sides of the connection support 1023 respectively, and are fixed by the connection support 1023. Further, the lighting device 106 is arranged at one side of the connection support 1023 close to a second cover 1026, and the fan assembly 104 is arranged at one side of the connection support 1023 close to a first cover 1024.

The lighting device 106 is connected to the shell 1022 by the connection support 1023, and is limited and fixed by a port on the second cover 1026.

Further, the connection support 1023 is in a shape of three claws, four claws, or multiple claws, and the connection support 1023 is connected to a circumferential side wall of the shell 1022.

In a particular embodiment, a wire passing recess 110 is provided at a connection support 1023, and routing needs for a wire supplying power to a lighting device can be satisfied.

The wire passing recess 110 may be provided at a circumferential inner side of the connection support 1023, and may further be provided at an axial central portion.

Air inlets may be only provided at a second cover 1026, or may be all provided at a shell 1022.

Similarly, air outlets may be only provided at a first cover 1024, or may be all provided at the shell 1022.

On the basis of any embodiment described above, a rotatable support 108 is arranged, and a cover structure 102 may drive an entire fan assembly to rotate, thereby achieving an effect of shaking a head. Specifically, rotation of a shell 1022 may be up-down rotation, or left-right rotation.

Figure 4:
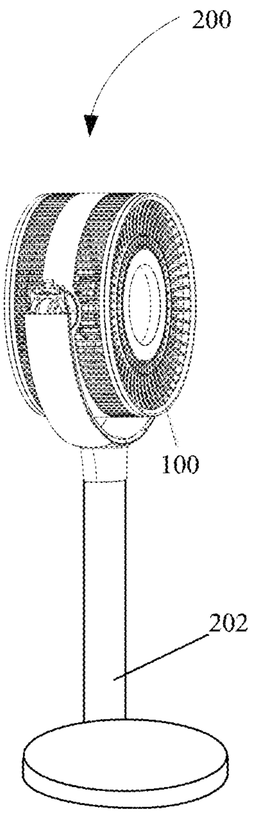
FIG. 4 is a schematic structural diagram of a fan apparatus according to an embodiment of the present application.

As shown in FIG. 4, an embodiment provides a fan apparatus 200. The fan apparatus includes a support seat 202 and a head assembly 100, where the support seat 202 has an effect of supporting the head assembly 100. Since the fan apparatus 200 includes the head assembly 100, the fan apparatus has the beneficial effects of any one of the head assembly 100 in the embodiment of the first aspect described above, which will not be repeated herein.

According to different structures of the support seat 202, the fan apparatus 200 may be divided into a floor-standing type fan apparatus and a desktop type fan apparatus. Moreover, the support seat 202 may be directly clamped to a table, attached to a wall, or erected on ground.

In a particular embodiment, a fan is provided. An atmosphere lamp device (i.e. a lighting device 106) is fixed at a rear of a fan head of the fan, and includes a lamp strip (i.e. a lighting member 107), reflection paper (i.e. a reflector 1066), a light guide plate (i.e. a light guide 1067) and a diffusion plate (i.e. a diffusion member 1068). A main objective of the reflection paper, the light guide plate and the diffusion plate is to make illumination brightness of light more uniform. The fan may be lightened after being energized. A front surface of the fan may satisfy daily air-blowing and cooling needs of a user, and a back surface of the fan may satisfy a daily lighting needs of the user.

A front half portion of the fan head is mainly an air supply device (i.e. a fan assembly 104). The air supply device includes: a front net cover (i.e. a first cover), a lock nut 1042, a fan blade 1044, a motor 1046 and a shell 1022. A rear half portion of the fan blade is mainly a lighting device. The lighting device includes: the atmosphere lamp device and a rear net cover (i.e. a second cover). The front net cover, the lock nut, the fan blade and the motor in the air supply device of the front half portion of the fan head are sequentially mounted on the shell 1022, and then the atmosphere lamp device and the rear net cover in the lighting device of the rear half portion of the fan head are each mounted on the shell 1022. Finally, the shell 1022 is fixed on a rotatable support 108 to complete structural mounting of air-blowing and lighting.

The atmosphere lamp device is mainly divided into a mounting disc (i.e. a mounting member 1064), a lamp strip (i.e. a lighting member 107), reflection paper, a light guide plate, a diffusion plate, a lamplight shade 1065 and a light shielding plate 1069. Firstly, the lamp strip is bonded to an inner side of the mounting disc by a back adhesive, a power line of the lamp strip is clamped into a wire passing recess 110, and the mounting disc is fixed with a screw on the shell 1022. Secondly, the reflection paper, the light guide plate and the diffusion plate are each sequentially placed in a middle of the mounting disc. Finally, the light shielding plate 1069 is clamped into a recess of the lamplight shade 1065 and is assembled to the mounting disc.

According to the head assembly and the fan apparatus according to the present application, a front surface may satisfy daily air-blowing and cooling needs of a user, and a back surface may satisfy a daily lighting needs of the user.

In the present application, the terms "first," "second" and "third" are merely for descriptive purposes and should not be construed as indicating or implying relative importance; and the term "a plurality of" refers to two or more unless expressly specified otherwise. The terms "mount," "connected," "connect," "fix," etc. should be understood in a broad sense. For example, "connect" can be a fixed connection, a detachable connection, or an integrated connection; and "connected" may be a direct connection, or an indirect connection by an intermediate medium. For those of ordinary skill in the art, the specific meanings of the above terms in the present application can be understood according to specific circumstances.

In the description of the present application, orientations or positional relations indicated by the terms "upper," "lower," "left," "right," "front," "back," etc. are based on the orientations or positional relations shown in the accompanying drawings and are merely for facilitating the description of the present application and simplifying the description, rather than indicating or implying that a device or unit referred to must have a particular orientation or be constructed and operated in a particular orientation, and therefore will not be interpreted as limiting the present application.

In the description of the present application, the description with terms "an embodiment," "some embodiments," "particular embodiments," etc. means that a specific feature, structure, material or characteristic described in combination with the embodiment or examples are encompassed in at least one embodiment or example of the present application. In the description, schematic expressions of the above terms do not necessarily refer to the same embodiment or example. Moreover, the specific feature, structure, material or characteristic described can be combined in a suitable manner in any one or more embodiments or examples.

What are described above are merely some embodiments of the present application and are not used to limit the present application, and various modifications and changes can be made to the present application by those skilled in the art. Any modifications, equivalent substitutions, improvements, etc. within the spirit and principles of the present application should all fall within the scope of the present application.

What is claimed is:

1. A head assembly comprising:
- a cover structure, provided with an air outlet end and an air inlet end that are opposite each other, the air inlet end of the cover structure being provided with a mounting port;
- a fan assembly arranged in the cover structure; and
- a lighting device arranged at the air inlet end of the cover structure, and configured to emit light rays towards a direction away from the air outlet end, the lighting device including:
  - a lighting housing arranged at the mounting port and including a mounting member and a lamplight shade that are detachably connected, the lamplight shade being arranged at one side of the mounting member away from the air outlet end; and
  - a lighting member arranged in the lighting housing and configured to emit light outwards through the lamplight shade.

2. The head assembly according to claim 1, wherein:
- the mounting member is disc-shaped; and
- the lighting member includes a lamp strip connected to the mounting member along a circumference of the mounting member.

3. The head assembly according to claim 2, wherein the lighting member is connected to a bottom wall surface of the mounting member.

4. The head assembly according to claim 2, further comprising:
- a reflector, a light guide, and a diffuser sequentially arranged along an axial direction of the fan assembly;
- wherein:
  - the lighting member is connected to a side wall surface of the mounting member;
  - the reflector is arranged close to the mounting member, and
  - in the axial direction of the fan assembly, projections of the reflector, the light guide, and the diffuser on the lighting member are located inside the lighting member.

5. The head assembly according to claim 4, further comprising:
- a light shielding plate;
- wherein:
  - the lamplight shade is provided with a mounting recess; and
  - the light shielding plate is detachably connected to the mounting recess, and configured to shield part of the light emitted by the lighting member.

6. The head assembly according to claim 1, wherein the cover structure includes:
- a shell with a connection support arranged in the shell, the fan assembly and the lighting device being connected to two sides of the connection support, respectively;
- a first cover detachably connected to a first end of the shell; and
- a second cover detachably connected to a second end of the shell.

7. The head assembly according to claim 6, further comprising:
- a rotatable support rotatably connected to the shell.

8. The head assembly according to claim 6, further comprising:
- a wire passing recess provided at the connection support, a wire of the lighting device passing through the wire passing recess.

9. The head assembly according to claim 6, further comprising:
- a rotatable support rotatably connected to the shell; and
- a wire passing recess provided at the connection support, a wire of the lighting device passing through the wire passing recess.

10. A fan apparatus comprising:
- a support seat; and
- a head assembly arranged at the support seat and including:
  - a cover structure, provided with an air outlet end and an air inlet end that are opposite each other, the air inlet end of the cover structure being provided with a mounting port;
  - a fan assembly arranged in the cover structure; and
  - a lighting device arranged at the air inlet end of the cover structure, and configured to emit light rays towards a direction away from the air outlet end, the lighting device including:
    - a lighting housing arranged at the mounting port and including a mounting member and a lamplight shade that are detachably connected, the lamplight shade being arranged at one side of the mounting member away from the air outlet end; and
    - a lighting member arranged in the lighting housing and configured to emit light outwards through the lamplight shade.

11. The fan apparatus according to claim 10, wherein:
- the mounting member is disc-shaped; and
- the lighting member includes a lamp strip connected to the mounting member along a circumference of the mounting member.

12. The fan apparatus according to claim 11, wherein the lighting member is connected to a bottom wall surface of the mounting member.

13. The fan apparatus according to claim 11, wherein:
- the head assembly further includes a reflector, a light guide, and a diffuser sequentially arranged along an axial direction of the fan assembly;
- the lighting member is connected to a side wall surface of the mounting member;
- the reflector is arranged close to the mounting member, and in the axial direction of the fan assembly, projections of the reflector, the light guide, and the diffuser on the lighting member are located inside the lighting member.

14. The fan apparatus according to claim 13, wherein:

the head assembly further includes a light shielding plate;

the lamplight shade is provided with a mounting recess; and the light shielding plate is detachably connected to the mounting recess, and configured to shield part of the light emitted by the lighting member.

15. The fan apparatus according to claim 10, wherein the cover structure includes:

a shell with a connection support arranged in the shell, the fan assembly and the lighting device being connected to two sides of the connection support, respectively;

a first cover detachably connected to a first end of the shell; and a second cover detachably connected to a second end of the shell.

16. The fan apparatus according to claim 15, wherein the head assembly further includes a rotatable support rotatably connected to the shell.

17. A head assembly comprising:

a cover structure, provided with an air outlet end and an air inlet end that are opposite each other, the cover structure including:

a shell with a connection support arranged in the shell, the fan assembly and the lighting device being connected to two sides of the connection support, respectively;

a first cover detachably connected to a first end of the shell; and a second cover detachably connected to a second end of the shell;

a fan assembly arranged in the cover structure; and a lighting device arranged at the air inlet end of the cover structure, and configured to emit light rays towards a direction away from the air outlet end.

* * * * *